June 30, 1925.
J. S. MILLER
1,544,022
SELF CLOSING AUTOMOBILE GATE
Filed Feb. 7, 1923     2 Sheets-Sheet 1
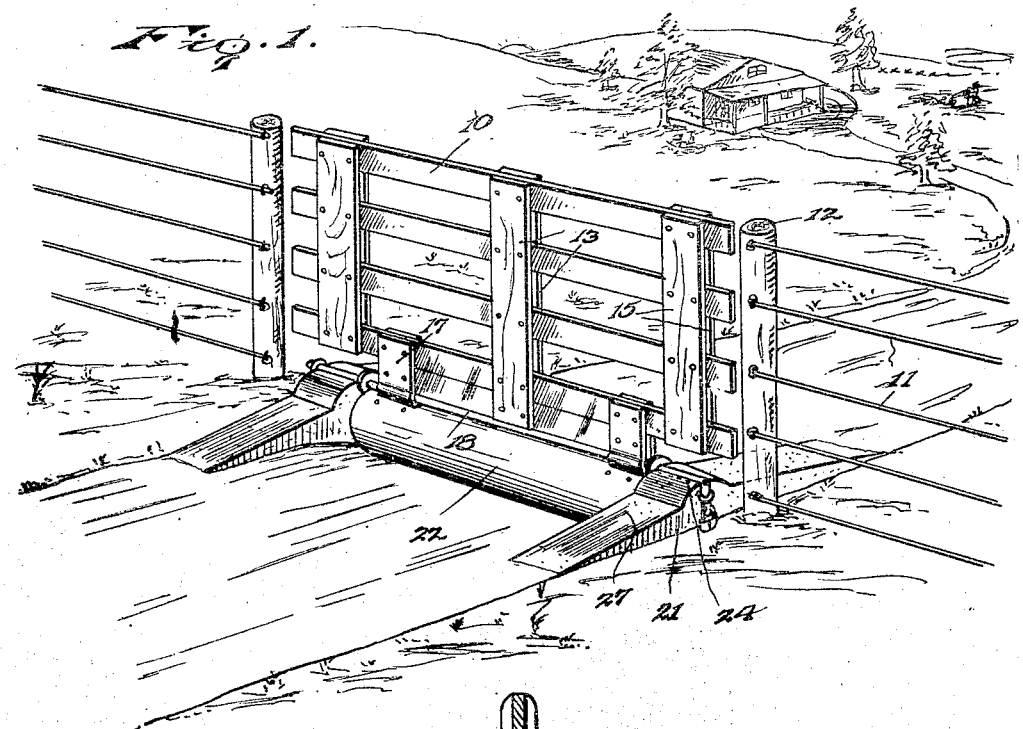
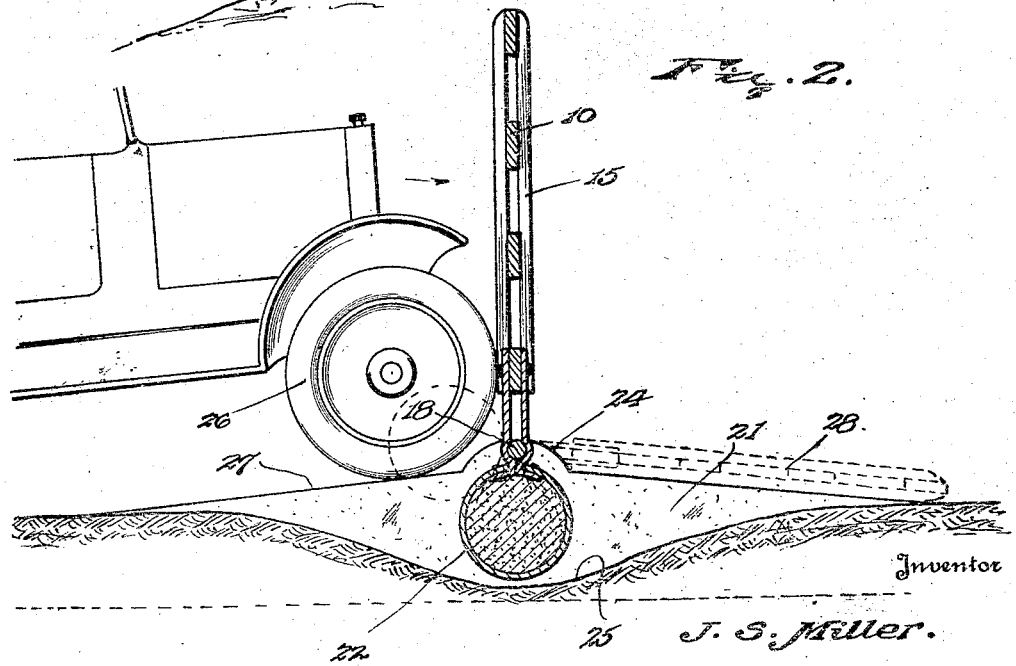
Inventor
J. S. Miller.
By Lacey & Lacey, Attorneys June 30, 1925.
J. S. MILLER
1,544,022
SELF CLOSING AUTOMOBILE GATE
Filed Feb. 7, 1923  2 Sheets-Sheet 2
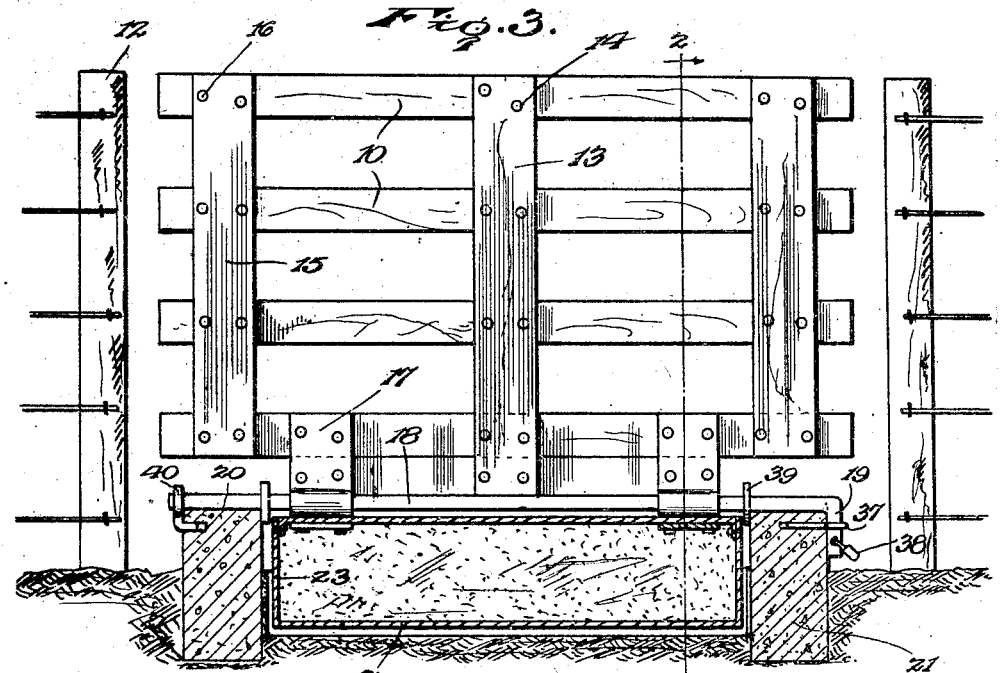
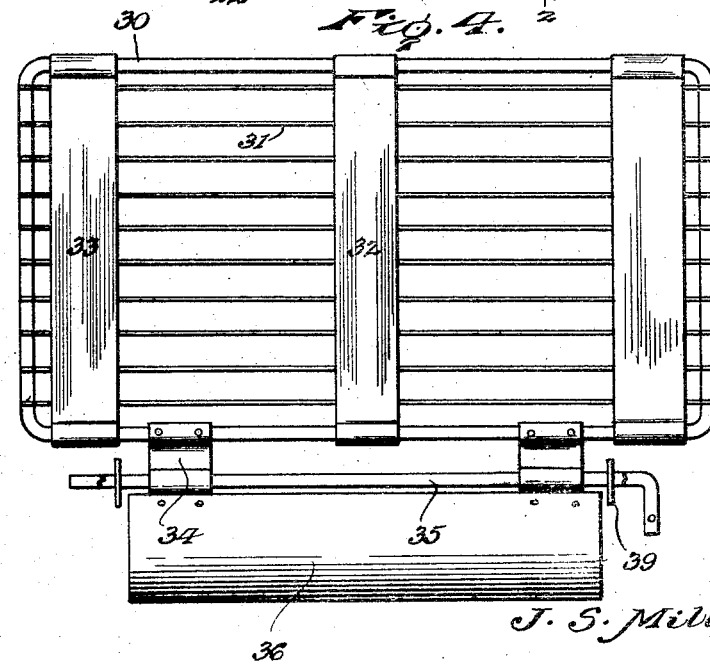
Inventor
J. S. Miller.
By Lacy & Lacy, Attorneys Patented June 30, 1925.

1,544,022

UNITED STATES PATENT OFFICE.

JAMES S. MILLER, OF CLINTON, NEBRASKA.

SELF-CLOSING AUTOMOBILE GATE.

Application filed February 7, 1923. Serial No. 617,508.

*To all whom it may concern:*

Be it known that I, JAMES S. MILLER, a citizen of the United States, residing at Clinton, in the county of Sheridan and State of Nebraska, have invented certain new and useful Improvements in Self-Closing Automobile Gates, of which the following is a specification.

My invention relates to a self closing gate for use in fences where automobiles have to pass through.

The main object of the invention is to provide a gate of this character, that may be opened by the front wheels of an automobile, passing through the gate opening and without the driver having to dismount to open it. The gate is also self closing directly after the automobile has passed through, so that it will not permit cattle to run out from the enclosure.

Another object of the invention is to make the gate portable so that, in case cattle have to be driven through or wagon teams have to pass, the gate is lifted out of its bearings and placed along the fence while the gate opening is being used.

It is a well known fact that a considerable time is wasted for stopping and starting an automobile in order to pass through a closed fence, when the operator has to dismount to open the gate. This waste of time is avoided by the use of the present invention as the automobile does not need to stop, only slow down slightly when passing through, as the front wheels will engage with the gate and push it over, when the gate itself forms part of the runway and is immediately released by the rear wheels of the automobile directly after the latter has passed through the gate opening.

In the accompanying drawings the invention has been illustrated in its preferred form and;

Figure 1 shows a perspective view of a gate erected across the roadway in alinement with a fence;

Figure 2 is a transverse section of a gate along line 2—2 of Figure 3;

Figure 3 is a front elevation thereof with the foundation and bottom part in section; and Figure 4 is a front elevation of a slightly modified form of gate.

Referring particularly to Figures 1, 2 and 3 of the drawings, reference numeral 10 represents longitudinal slats of a length corresponding to the gate opening in the fence 11 between the fence posts 12, in which the gate is erected. These slats 10 are preferably held together by central uprights 13, one on each side of the slats and bolts or rivets 14 which run through both the uprights and the slats to make a firm connection. At each end of the gate other uprights 15 are provided similarly gripping the slats 10 between them and rigidly secured thereto by rivets or bolts 16. These slats and uprights are preferably made of hard wood and for a fence of ordinary height the slats are preferably made of boards ⅞ inches thick, 4 inches wide and 6 feet long, while the end upright are ⅞ inches thick, 4 inches wide and 3 feet 2 inches long. Other dimensions and sizes may of course be used to suit conditions, and at times it might be preferable to place two boards side by side to increase the width of the end uprights.

Reference numeral 17 represents hinges which may also be made of wooden boards, but are preferably manufactured of sheet metal and engage revolubly a hinge bar 18 which, as best seen in Figure 3, is provided with a bent down end 19 and carried in notches or grooves 20 provided in suitable foundations 21. At the lower end of the hinges 17 is rigidly secured a hollow cylinder 22, preferably made of galvanized iron or zinc, which is closed at both ends as at 23 and filled with sand or other suitable heavy material.

Washers 39 are furnished on the hinge bar 18 and placed between each end of the cylinder 22 and the inner sides of the foundations 21 to prevent the rubbing of the cylinder against the latter. In this manner the cylinder 22, when filled, constitutes a weight sufficient to keep the gate in upright position when hung on the hinge bar 18, as seen in Figures 1, 2 and 3.

The foundations 21 are preferably made of cement or concrete and positioned along the roadway so as to form a proper runway for the automobile wheels. For this reason the width of the foundations 21 is about eight inches or more and the side uprights 15 on the gate are placed in alinement with these runways, as best seen in Figures 1 and 3. The runways are placed sufficiently deep in the ground to be firm enough to carry an automobile, and both ends are inclined upwards to the middle portion 24 of the runways so as to form no obstruction for the wheels in passing.

As seen in Figure 2, the roadway may be slightly depressed under the gate as at 25 to permit the cylindrical weight 23 to swing back and forth during the operation of the gate.

When an automobile approaches to pass through the fence, as seen in Figure 2, the front wheels 26 run up the slope 27 formed on the nearest side of the runway 21 and when near the middle portion 24 of the latter, the wheels will contact with the side uprights 15 on the gate, pushing the same over, as indicated by dotted lines in Figure 2. The gate will then be folded over away from the automobile until resting on the down slope 28 on the other side of the fence when the wheels will pass along the side uprights 15, which are then uppermost on the gate. Directly the rear wheels of the automobile have passed the ends of the side uprights, the gate will again be able to swing into upright position, as actuated by the cylindrical weight 22 at the bottom thereof.

Referring to Figure 4 of the drawings, a slightly modified form of the gate is indicated. In this case a frame 30 is formed preferably of iron bar or pipe with wiring 31 stretched between the short ends thereof and central uprights 32 provided as above to secure around the top and bottom sides of the frame 30 and other uprights 33 similarly secured, one pair at each end of the gate, adapted to register with the runways 21 as before. Hinges 34, similar to the hinges 17 already described, carry the hinge bar 35 and the cylindrical body 36.

It is evident that, as both sides of the gate are similar, it is immaterial which way the vehicle approaches, as it can operate the gate both from the inside and from the outside to tilt it over and pass along the road.

When a buggy or wagon is to pass through the gateway, or a herd of cattle to be driven through the same, the gate may be lifted off the runways and placed along the fence until the vehicle or cattle has passed through. It is evident that no cattle can pass through the gate, when the latter is in position in the fence, and this gate is just as safe to keep the cattle in an enclosure as an ordinary swinging gate, which has to be hand operated.

In order to firmly secure the hinge bar 18 and prevent it from turning, I may provide staples 37 and 40 cast in the solid foundation 21, as best seen in Figures 1 and 3. The staple 37 is placed horizontally, projecting with its eye portion beyond the side face of its foundation 21 in order to engage with the hooked end 19 of the hinge bar 18. The lower end of the hook 19 may be furnished with a small aperture for receiving a padlock 38. This will secure the gate in position and prevent its removal by unauthorized persons. The straight left end of the bar 18, as seen in Figure 1, engages in the upwardly extending staple 40.

Having thus described the invention what is claimed as new is:

1. A gate mechanism comprising foundations arranged at the sides of a roadway in a gate opening and having their upper surfaces inclined downwardly from their centers to their ends whereby to constitute runways for the wheels of an automobile, a hinge bar extending between said foundations and secured thereto at the centers thereof, a gate frame arranged above the foundations and having tracks upon its sides alined with the foundations, hinge members secured to said frame and depending therefrom between the foundations to rotatably engage and extend beyond the hinge bar, and a weight fixed to the lower ends of said hinge members and normally holding the gate frame upright.

2. A gate mechanism comprising foundations arranged at the sides of a roadway in a gate opening and having their upper surfaces inclined downwardly from their centers to their ends whereby to constitute runways for the wheels of an automobile, a hinge bar extending between said foundations and secured thereto at the centers thereof, a gate frame arranged above the foundations and having tracks upon its sides alined with the foundations, hinge members secured to said frame and depending therefrom between the foundations to rotatably engage and extend beyond the hinge bar, a cylinder fixed to the lower ends of said hinge members, and a filler of substantial weight in said cylinder.

3. A gate mechanism comprising foundations arranged at the sides of a roadway in a gate opening and having their upper surfaces inclined downwardly from their centers to their ends whereby to constitute runways for the wheels of an automobile, said foundations being provided with transverse grooves in their upper surfaces at their centers, a hinge bar extending between said foundations and resting at its ends in the grooves therein, means for releasably locking the rod in said grooves, a gate frame arranged above the foundations and having tracks upon its sides alined with the foundations, a hinge member secured to said frame and depending therefrom between the foundations to rotatably engage and extend beyond the hinge bar, and a weight fixed to the lower ends of said hinge members and normally holding the gate frame upright.

In testimony whereof I affix my signature.

JAMES S. MILLER. [L. S.]